(12) United States Patent  
Newman

(10) Patent No.: US 6,182,371 B1
(45) Date of Patent: Feb. 6, 2001

(54) ROUTER GUIDE APPARATUS WITH SECURING MEANS

(76) Inventor: Roger R. Newman, 20 Lytton Boulevard, Toronto (CA), M4R 1L1

( * ) Notice: Under 35 U.S.C. 154(b), the term of this patent shall be extended for 0 days.

(21) Appl. No.: 09/207,517

(22) Filed: Dec. 9, 1998

(51) Int. Cl.$^7$ ................................ B27M 3/00; E06B 3/00
(52) U.S. Cl. .............................. 33/194; 33/197; 33/562; 144/144.1
(58) Field of Search ...................... 144/27, 144.1, 144/145.1, 372; 33/194, 197, 562, 613, 628, 630, 638, 642

(56) References Cited

U.S. PATENT DOCUMENTS

| | | | |
|---|---|---|---|
| 3,789,892 | * 2/1974 | Converse et al. | 144/144.5 |
| 3,967,665 | * 7/1976 | Lund | 144/144.1 |
| 4,434,824 | 3/1984 | Bussey | 144/134 |
| 4,914,822 | * 4/1990 | Wetherington | 33/197 |
| 5,042,542 | * 8/1991 | Purviance | 33/628 |
| 5,052,454 | * 10/1991 | Meinhardt | 144/144.5 |
| 5,123,463 | 6/1992 | Grisley | 144/83 |
| 5,154,214 | * 10/1992 | Hagerman | 33/197 |
| 5,433,009 | 7/1995 | Keels, Jr. | 33/197 |
| 5,494,089 | 2/1996 | Lubbe | 144/144 R |
| 5,533,556 | * 7/1996 | Whitney | 144/27 |
| 5,862,848 | * 1/1999 | Beall | 144/27 |
| 5,893,402 | * 4/1999 | Darling | 144/144.1 |
| 6,065,913 | * 5/2000 | Rogers | 33/197 |
| 6,112,783 | * 9/2000 | Newman | 144/144.52 |

OTHER PUBLICATIONS

Spielman, P., *The New Router Handbook* (New York: Sterling Publishing Co., 1993) pp. 181–183.
Spielman, P., *Router Jigs and Techniques* (New York: Sterling Publishing Co., 1988) pp. 293–294.
De Cristoforo, R.J., *The Portable Router Book, 2nd Edition* (Blue Ridge Summit, PA: Tab Books, 1994) pp. 236–237.

* cited by examiner

Primary Examiner—Randy W. Gibson
(74) Attorney, Agent, or Firm—Bereskin & Parr

(57) ABSTRACT

The present invention provides a router guide apparatus having a securing means for securing the apparatus to the sides or edges of boards and panels, and particularly the sides or edges of doors and windows. The apparatus comprises a working platform; securing means for securing the working platform to a workpiece with the working platform mounted on the securing means; an aperture for a router bit to extend through the working platform; and a fence means on the working platform for guiding the base of the router.

17 Claims, 22 Drawing Sheets

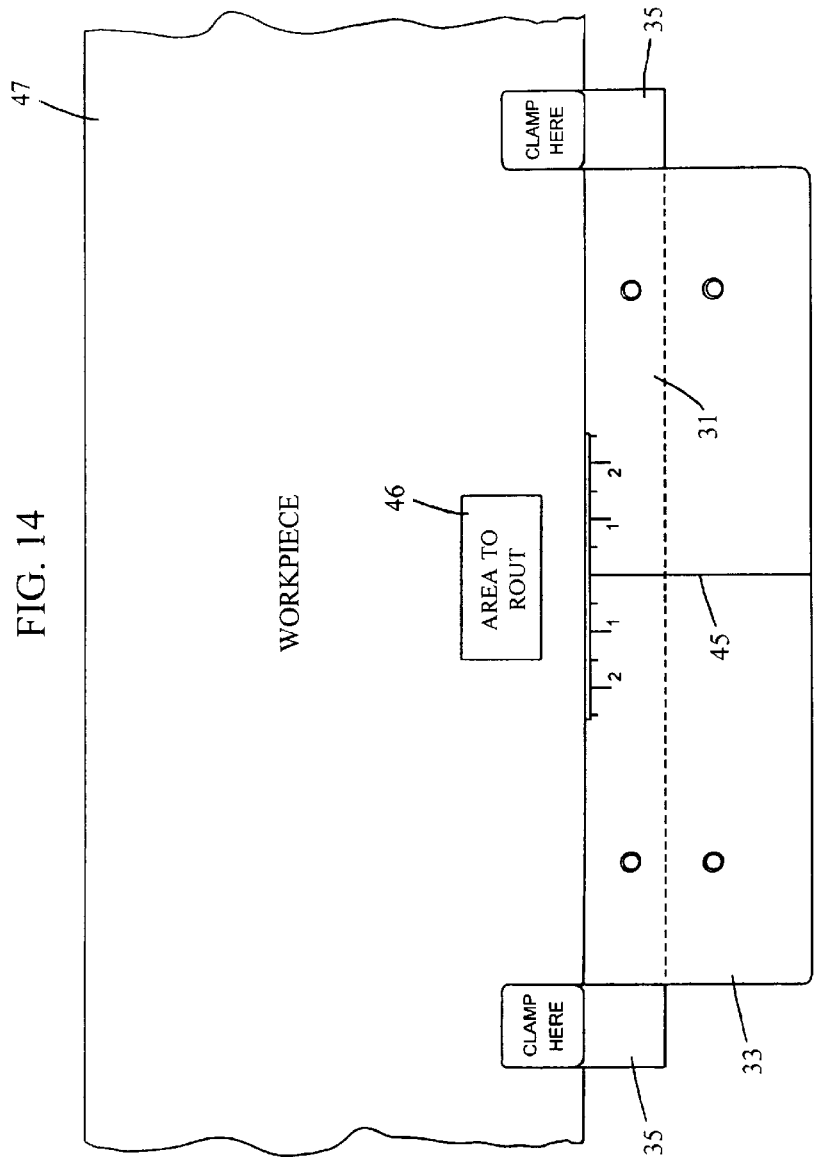
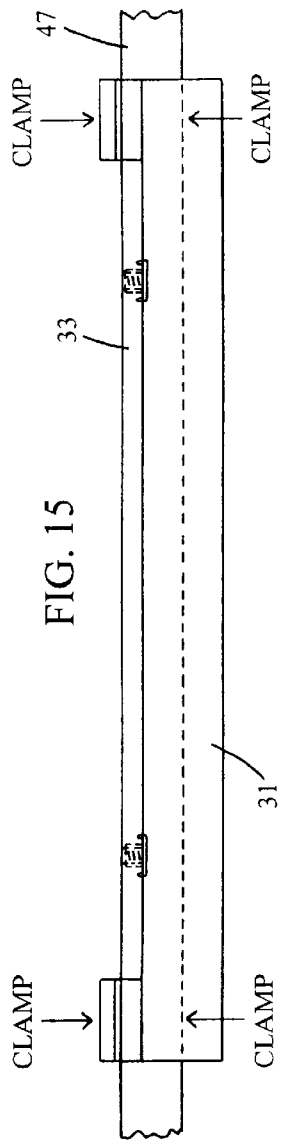
FIG. 14
FIG. 15

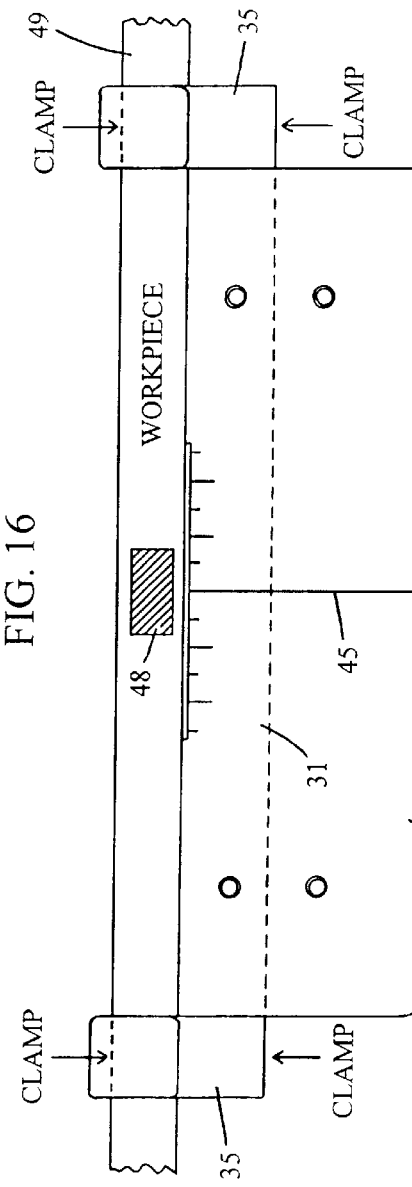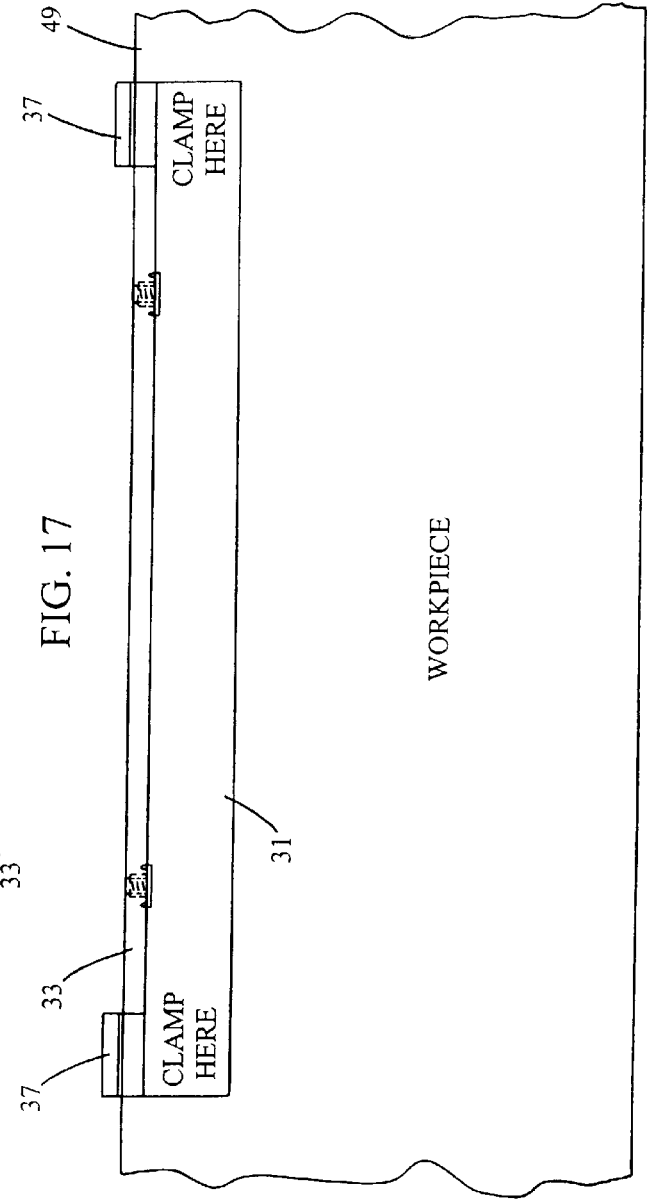

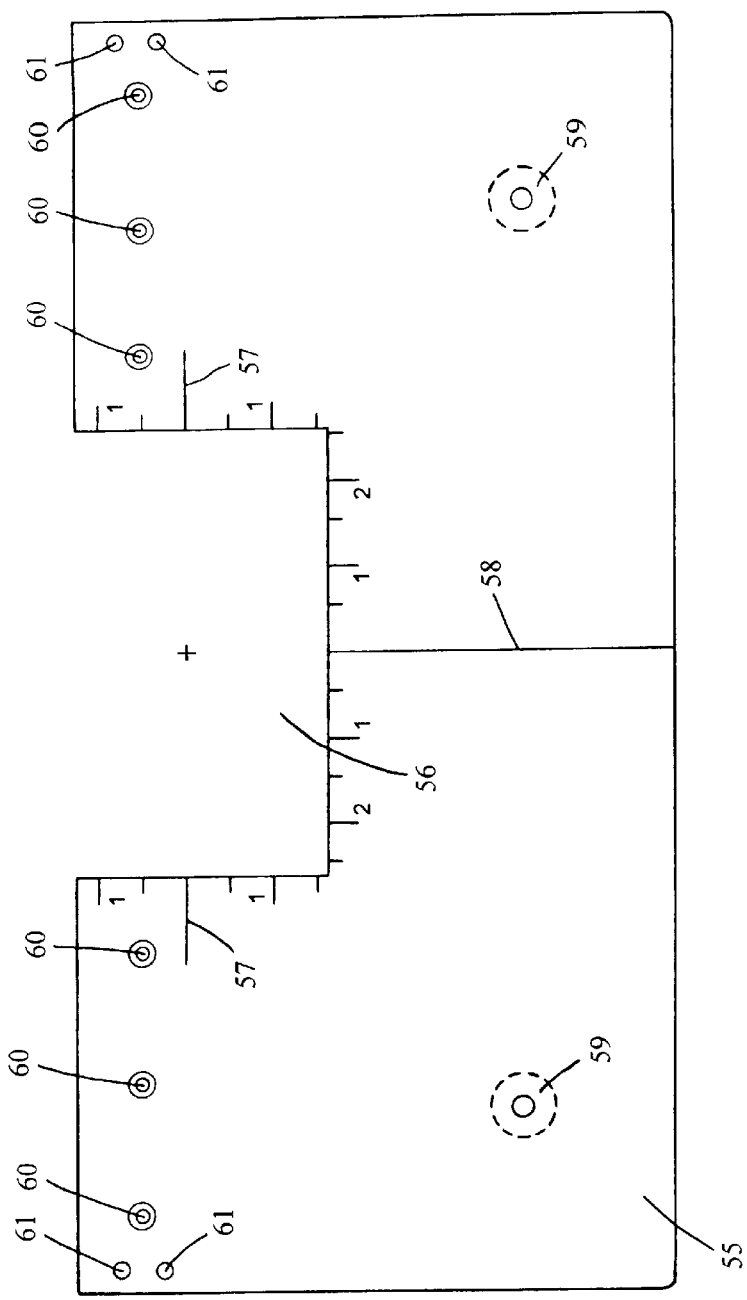
FIG. 26
FIG. 28
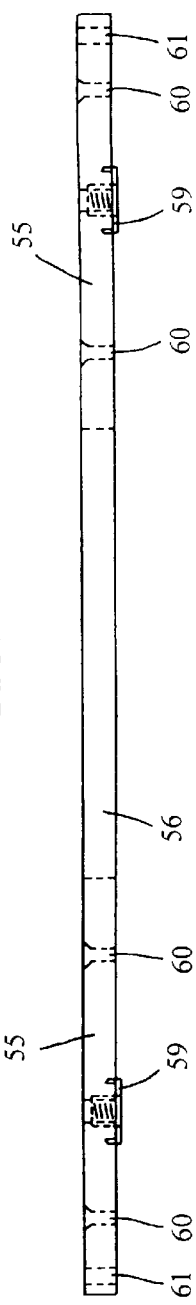
FIG. 27

ROUTER GUIDE APPARATUS WITH SECURING MEANS

FIELD OF THE INVENTION

This invention relates to a router guide apparatus having a securing means for securing the apparatus to the sides or edges of boards and panels, and particularly the sides or edges of doors and windows.

BACKGROUND OF THE INVENTION

When routing the edges of boards and panels, such as a recess for a door hinge, it is desirable to provide a stable working platform on which the router can rest.

In the prior art, a number of designs have been proposed for templates and devices which can be used for routing recesses for door hinges. One such design is shown in Spielman, P., *The New Router Handbook* (New York: Sterling Publishing Co., 1993) at pp. 181–183. In illus. 14-13 and 14—14, a template guide for door hinge mortising is shown. The template guide shown in illus. 14-13 and 14—14, provides two parallel supporting rails on which the hand-held router can rest. However, the two supporting rails form a relatively narrow gauge track and the hand-held router has a substantial overhang, with the possibility that the hand-held router could easily tip during use. On p. 182, in illus. 14-17 to 14-19, another door hinge template is shown attached to a clamping block. While the apparatus in illus. 14-17 to 14-19 provides a wider platform, it is still possible for the hand-held router to tip if brought close to the edge, as shown in illus. 14-18. Furthermore, the area to be mortised is fixed by the fixed rectangular hole cut into the fixed platform.

Another prior art design is disclosed in Spielman, P., *Router Jigs and Techniques* (New York: Sterling Publishing Co., 1988) at pp. 293–294. In illus. 610-612, a C-shaped template is shown nailed onto a clamping bar. Again, the platform has a relatively narrow width, and it is possible that the router can tip if brought close to the edge, as shown in illus. 611.

Yet another prior art design is disclosed in De Cristoforo, R. J., *The Portable Router Book*, 2nd Edition (Blue Ridge Summit, Pa.: Tab Books, 1994) at pp. 236–237. The template design shown in FIG. 11-52, on p. 236, is narrow, and relies on the router operator to keep the router from tipping. The designs shown in FIGS. 11-53 and 11-54, on p. 237, are similar to the designs shown in the Spielman references and, therefore, suffer from the same drawbacks.

SUMMARY OF THE INVENTION

What all these proposals have in common is that they require the use of a template guide. Correspondingly, they do not provide adequate support for the router base. The present invention is based on the realization that it is preferable to guide the router by its base and to provide full support for the base.

The present invention provides a router guide apparatus having a securing means which provides better performance than prior art devices.

In a first aspect, the present invention provides a guide apparatus, for use with a router having a base, an edge on the base for guiding the router, and a router bit extending out from the router for rotation about a router axis, the guide apparatus comprising:

(1) a working platform;
(2) securing means for securing the working platform to a workpiece with the working platform mounted on the securing means, said securing means being separable from said working platform;
(3) an aperture for the router bit to extend therethrough; and
(4) a fence means on the working platform for guiding the base of the router, said fence means comprising a plurality of independently adjustable guide fences, at least one of the guide fences being an outboard fence positionable beyond the working platform.

Preferably, the securing means comprises a clamping projection means extending down below the working platform whereby, in use, the clamping projection means can be clamped to the workpiece. The clamping projection means comprises a generally elongate clamping bar, extending out beyond the working platform at either end thereof.

Advantageously, the securing means includes flange tabs projecting from the ends of the clamping bar and located beside and substantially parallel to the working platform.

In another aspect, the present invention provides a method of routing a workpiece, the method comprising:

(1) providing a portable router having a router base and a router bit extending from the base;
(2) providing a guide apparatus comprising
 (a) a working platform;
 (b) securing means for securing the working platform to a workpiece, said securing means being separable from said working platform;
 (c) an aperture for the router bit to extend therethrough; and
 (d) a fence means on the working platform for guiding the base of the router, said fence means comprising a plurality of independently adjustable guide fences, at least one of the guide fences being an outboard fence positionable beyond the working platform;
(3) mounting the guide apparatus by the securing means to a workpiece;
(4) adjusting the fence means to a desired location, and selecting and fitting a desired router bit to the router; and
(5) operating the router and guiding the router on the working platform by the fence means to route the workpiece.

Preferably, the method further provides the steps of:

(a) providing a securing means having a clamping bar providing surfaces perpendicular to the working platform and flange tabs substantially parallel to the working platform; and
(b) clamping one of the flange tabs and the perpendicular clamping surfaces to the top surface of the workpiece adjacent the side edge surface thereof, for routing the workpiece on the edge or adjacent the side edge surface.

Further objects and aspects of the invention will be apparent from the following description, taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention, and in which:

FIG. 14 shows a top view of the securing means mounted onto the flat side of a board-shaped workpiece, such as a door;

FIG. 15 shows a corresponding front view of the securing means and workpiece shown in FIG. 14;

FIG. 16 shows a top view of the securing means mounted onto the edge of a board-shaped workpiece;

FIG. 17 shows a corresponding front view of the securing means and board-shaped workpiece shown in FIG. 16;

FIGS. 26–28 show a top view, a front view, and an end view, respectively, of a jamb attachment plate;

DETAILED DESCRIPTION OF THE INVENTION

The apparatus of the present invention is, at some points, referred to as a "smartguide".

Figure 1A:
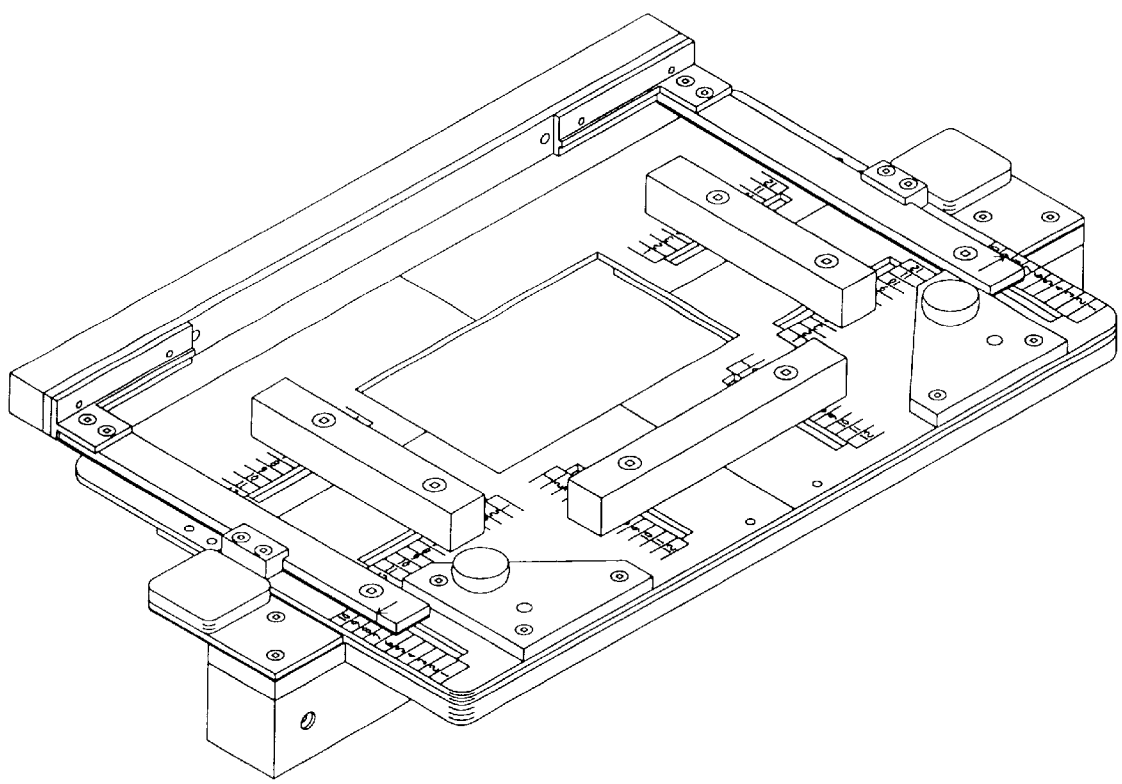
FIG. 1A shows an isometric view of an apparatus according to the present invention having a working platform mounted on a securing means.
Figure 1B:
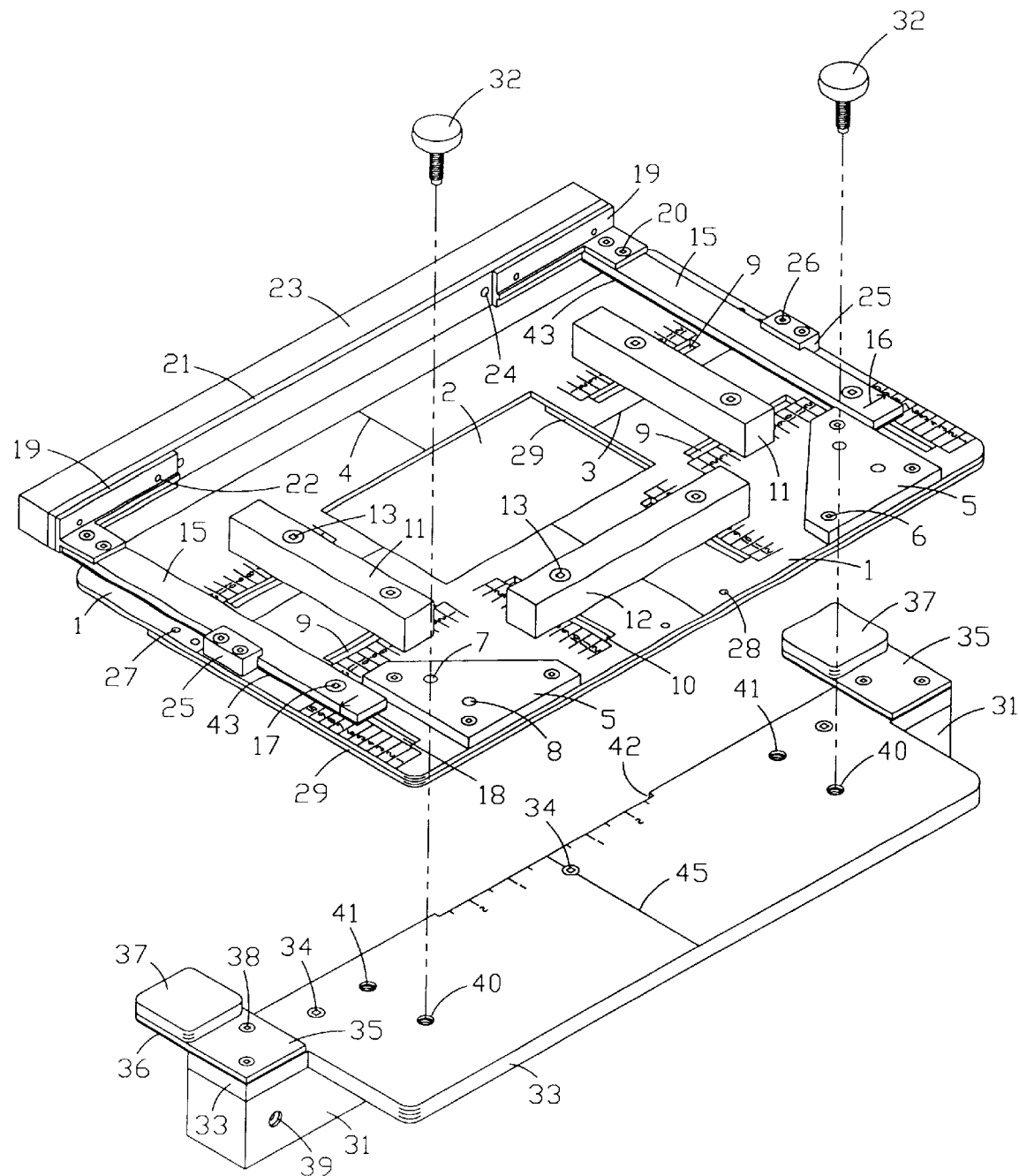
FIG. 1B shows an exploded isometric view of the apparatus of FIG. 1A, with the working platform shown spaced above the securing means.
Figure 2:
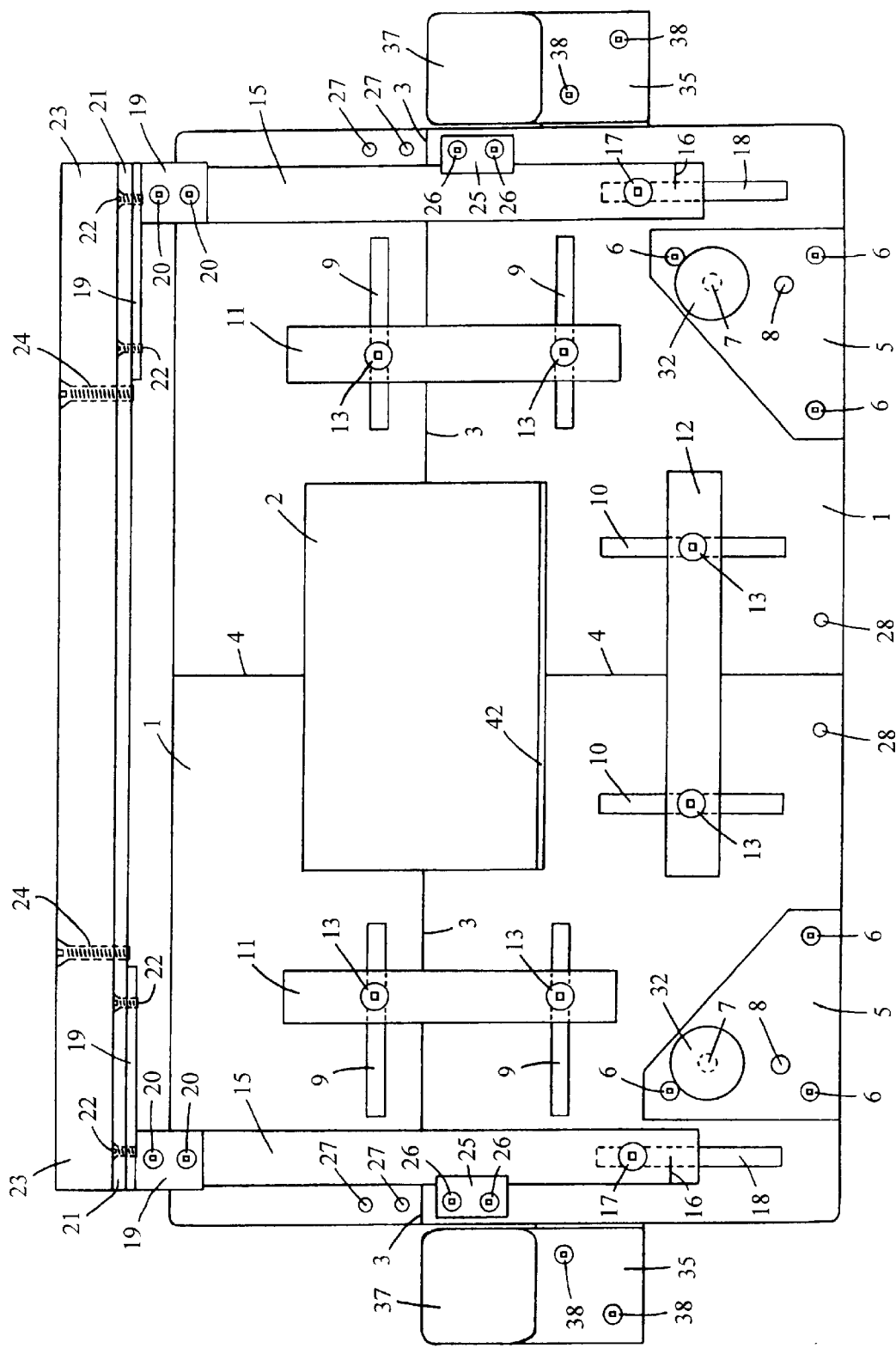
FIG. 2 shows a top view of the working platform and a partially hidden view of the securing means.

Referring to FIGS. 1A, 1B, and 2, a platform area 1 has a large rectangular hole 2 near its center in which all routing activity will take place. The base plate of a standard hand-held router sits on the platform area 1 and slides around in the middle of the platform area 1, where it is limited by each of three inboard adjustable fences 11, 12 and also by an outboard adjustable fence 21. Located underneath each of the two inboard adjustable fences 11 are a pair of slots 9 cut out of the platform area 1. Similarly, underneath the other inboard adjustable fence 12 is a pair of slots 10, also cut out of the platform area 1. Each of the inboard adjustable fences 11, 12 has two flat-headed machine screws 13 passing through it and aligned with respective pair of slots 9, 10.

Figure 3:
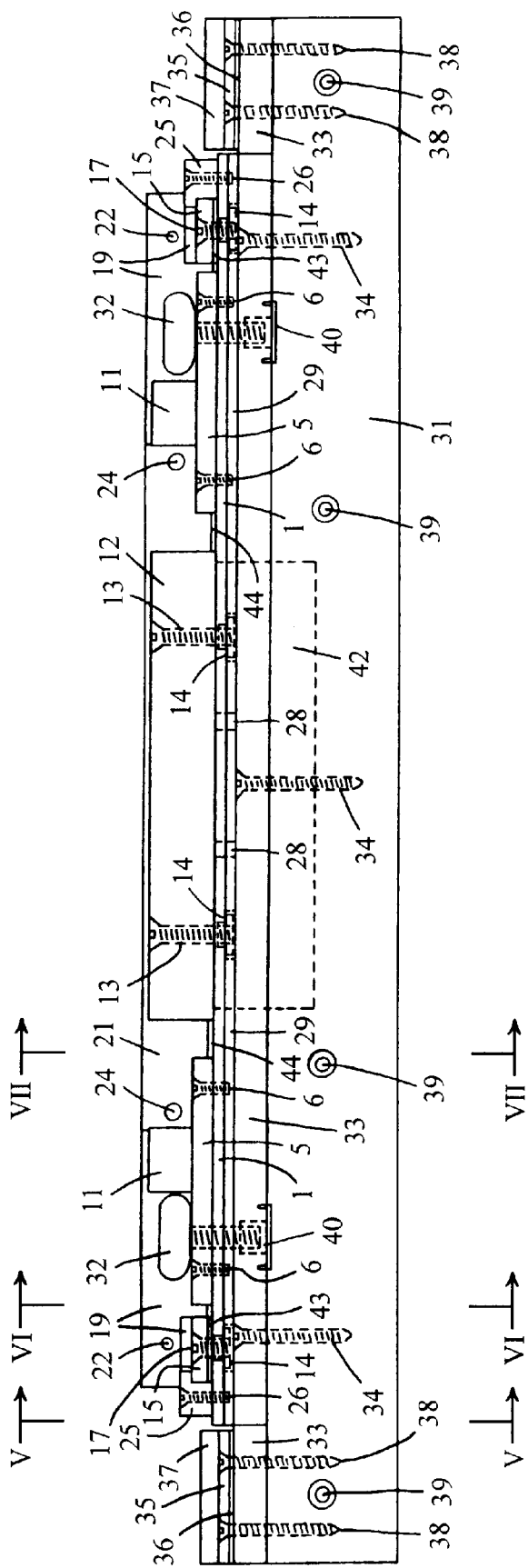
FIG. 3 shows a front view of the apparatus.
Figure 4:
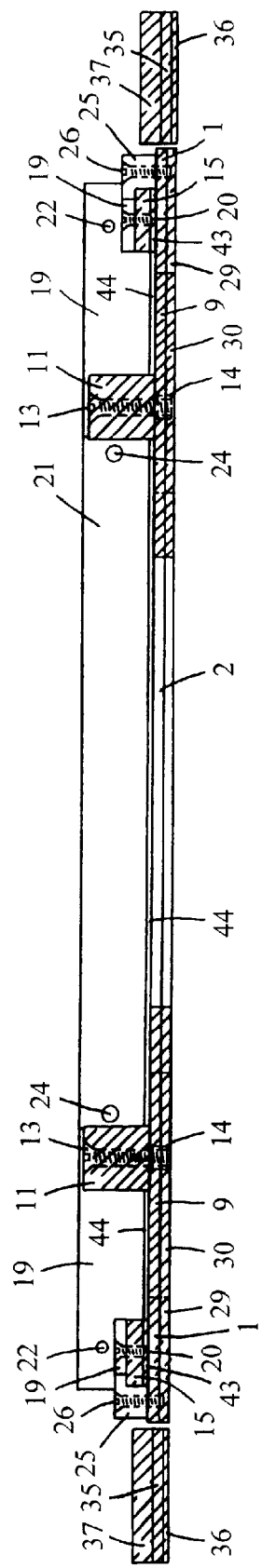
FIG. 4 shows a cross-sectional front view of the apparatus taken along the line II—II, indicated in FIG. 6.
Figure 10:
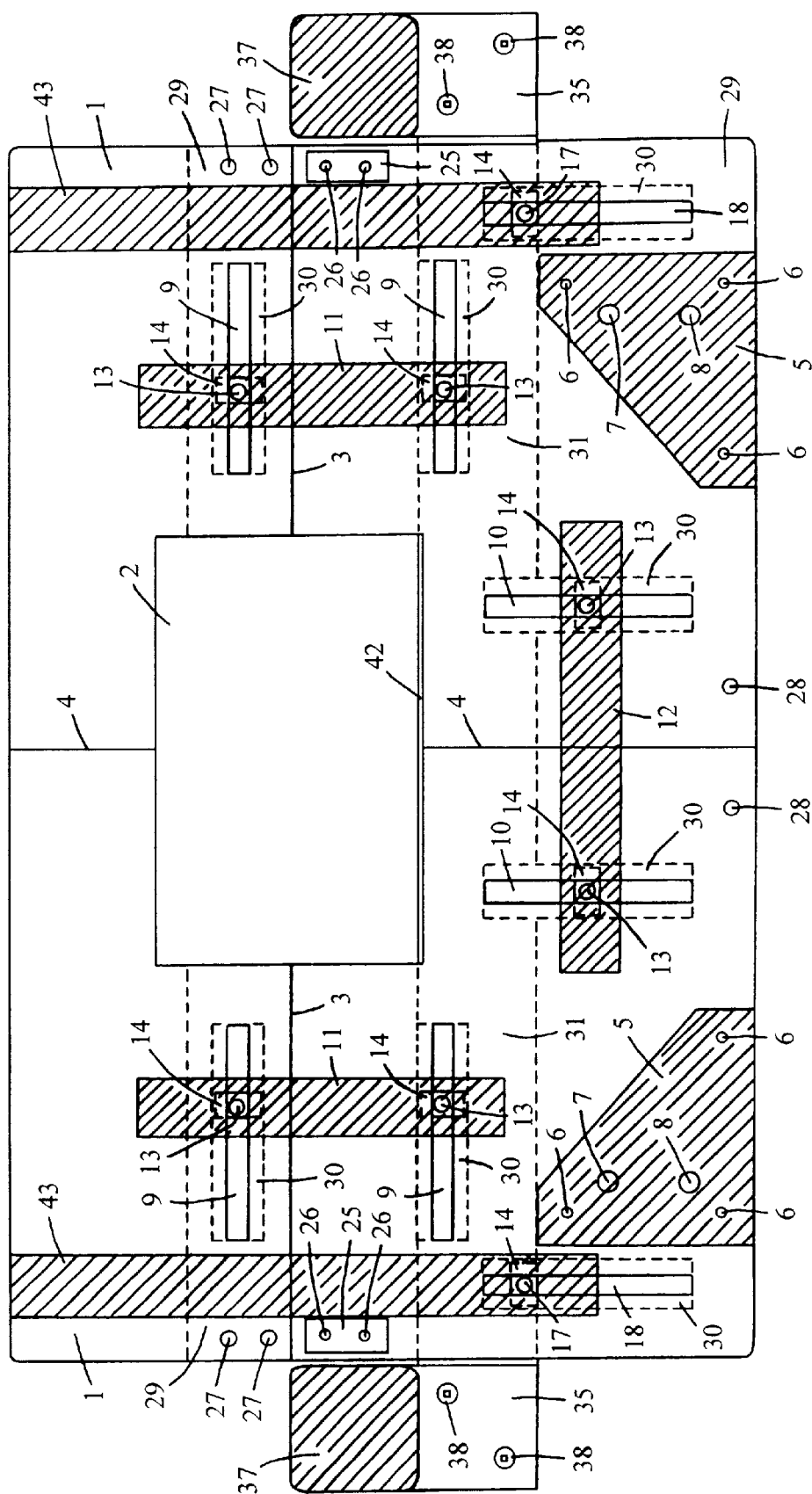
FIG. 10 shows a cross-sectional top view of the apparatus taken along the line IV—IV, indicated in FIG. 6.

Now referring to FIGS. 3, 4, and 10 screwed onto the bottom of each flat-headed machine screw 13, and underneath the pairs of slots 9, 10, are T-nuts 14 having square shanks to prevent them from turning inside wide slots 30 running along and underneath each slot 9, 10.

There are several reasons for having an outboard adjustable fence 21, distinct from the inboard adjustable fences. The primary reason is to avoid the necessity of having T-nuts, as described below, located in the rear quarter of the working platform. This enables the rear quarter of the working platform to be thin, smooth and flat. This is an important feature when the working platform is used with a jamb attachment plate 55 described further below. A second reason for having the outboard adjustable fence 21 is that the rear overhang of the working platform is significantly reduced. The reduced rear overhang also allows the smartguide to be used closer to walls or other obstructions in an enclosed area.

As shown in FIGS. 1B–3, the outboard adjustable fence 21 is fastened at each end onto T-shaped brackets 19 by means of flat-headed machine screws 22. The T-shaped brackets 19 are fastened onto the two outboard fence adjustment arms 15 by means of flat-headed machine screws 20. The underside of each outboard fence adjustment arm 15 has a layer of soft plastic 43 glued onto it, which acts as a sliding and bearing surface. The layer of soft plastic 43 also raises the entire outboard adjustable fence assembly by the thickness of the layer. This provides a small amount of clearance 44 (shown in FIG. 3) between the top surface of the platform area 1 and the outboard adjustment fence 21 when it is moved inboard. Notched guide blocks 25, which act to guide and control the movement of the outboard fence adjustment arms 15, are fastened onto the platform area 1 by means of flat-headed machine screws 26. In the platform area 1 underneath the two outboard fence adjustment arms 15, are slots 18. Flat-headed machine screws 17 are aligned through the slots 18 and screw into T-nuts 14 (also with square shanks) positioned in wide slots 30 (shown in FIG. 10) running underneath each slot 18. The outboard fence adjustment arms 15 are free to slide back and forth until the flat-headed machine screws 17 are tightened.

Figure 5:
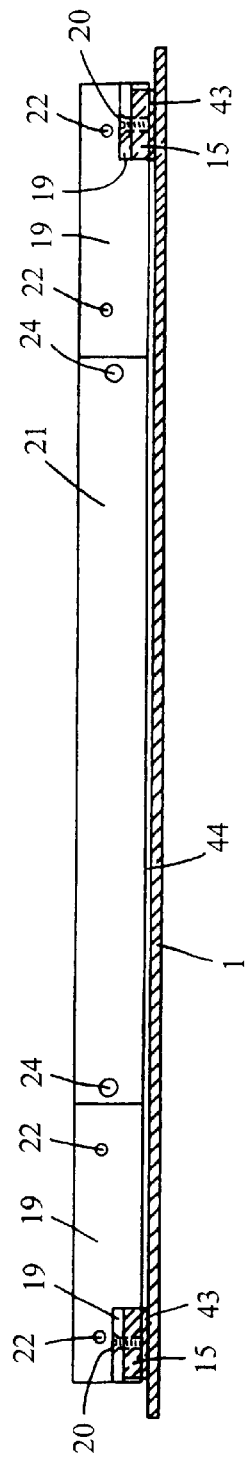
FIG. 5 shows a cross-sectional front view of the working platform taken along the line III—III, indicated in FIG. 6.
Figure 9:
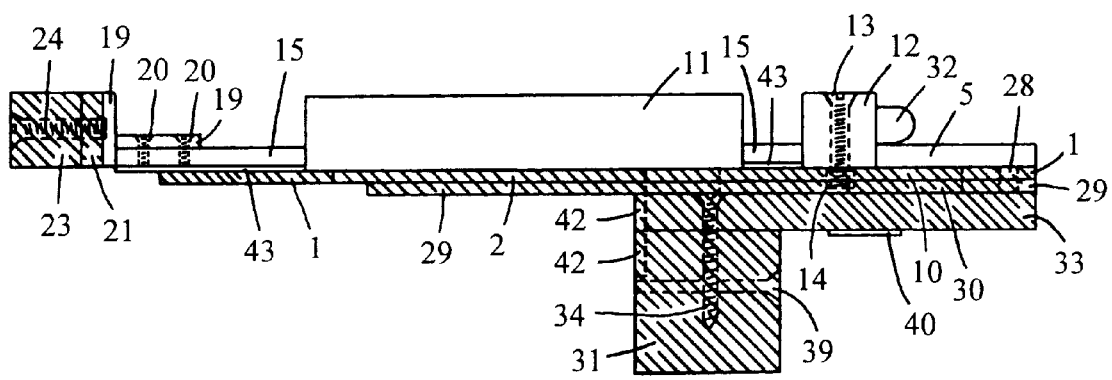
FIG. 9 shows a cross-sectional end view of the apparatus taken along the line VII—VII, indicated in FIG. 3.

As shown in FIGS. 2, 5 and 9, the outboard adjustable fence 21 has a removable backing block 23 attached onto it for rigidity. The removable backing block 23 is fastened onto the outboard adjustable fence 21 by means of flat-headed machine screws 24.

Figure 6:
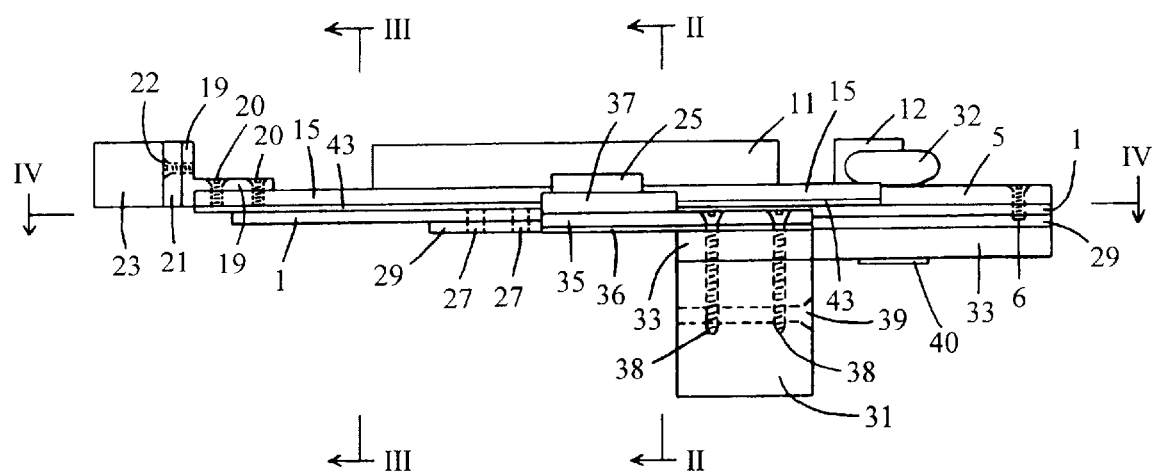
FIG. 6 shows an end view of the apparatus.
Figure 7:
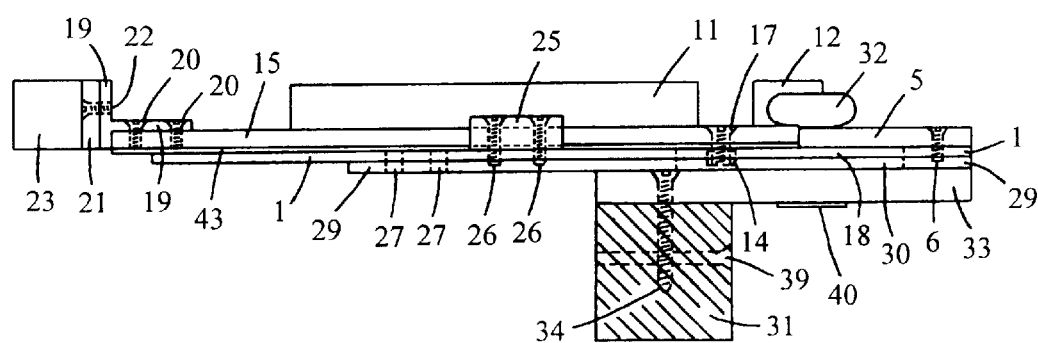
FIG. 7 shows a cross-sectional end view of the apparatus taken along the line V—V, indicated in FIG. 3.

Now referring to FIGS. 6 and 7, glued onto the underside of platform area 1 is a backing plate 29. The backing plate 29 covers only about three quarters of the underside surface as shown in FIG. 1B. The reason for this is related to the use of the jamb attachment plate 55, which will be described in greater detail below. The backing plate 29 has wide slots 30, as described earlier, located underneath each of the slots 9, 10, 18, in the platform area 1.

Referring back to FIGS. 1B and 2, reference lines 3 and 4 are provided to indicate the center of the large rectangular hole 2. It will be noticed that the two inboard adjustable fences 11 are not centered over the reference line 3. This is so that the slots 9, with their associated wide slots 30, can be located in the area of the working platform that has the backing plate 29 glued onto it. The underside of the remaining area, without any backing plate 29, is thus kept clear of any T-nuts 14, and will remain smooth and flat.

Calibrations for setting each of the four adjustable fences 11, 12, 21, are shown in FIG. 1B. Note that, in the case of the outboard fence adjustment arms 15, reference marks 16 are used.

Figure 8:
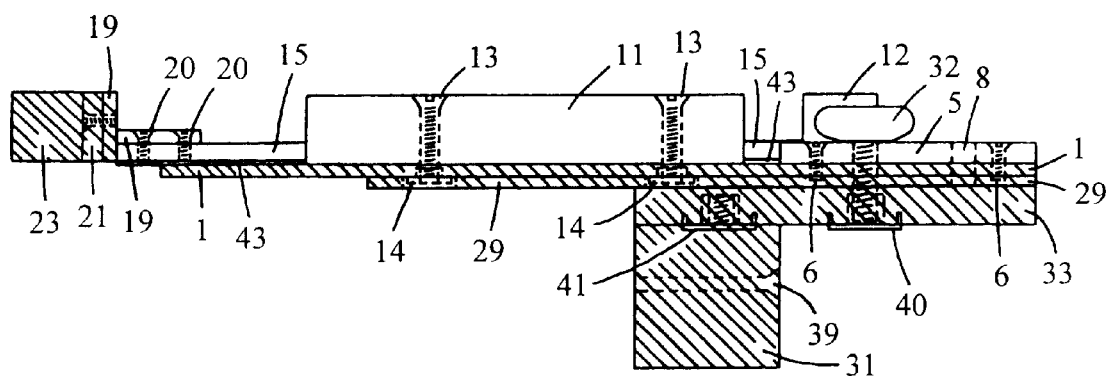
FIG. 8 shows a cross-sectional end view of the apparatus taken along the line VI—VI, indicated in FIG. 3.

Referring back to FIG. 2, and to FIGS. 8 and 9, near each of the front corners on top of the platform area 1 are triangular clampdown plates 5, which are fastened onto the platform area 1 by means of flat-headed machine screws 6. Two clearance holes 7 and 8 are drilled through each of the triangular clampdown plates 5. These holes 7, 8 extend through the platform area 1, and also through the backing plate 29. Two screw knobs 32 are normally placed in the two clearance holes 7 of the triangular clampdown plates 5, and then are screwed into spiked T-nuts 40 located in the mounting plate 33 of the clamp bar assembly.

Now referring to FIG. 10, small holes 27 and 28, located near the outside edges of the platform area 1, are provided so that the working platform can be screwed down directly onto a workpiece if desired, using #6 flat-headed wood screws, when the working platform is used independently from the clamp bar assembly.

Figure 11:
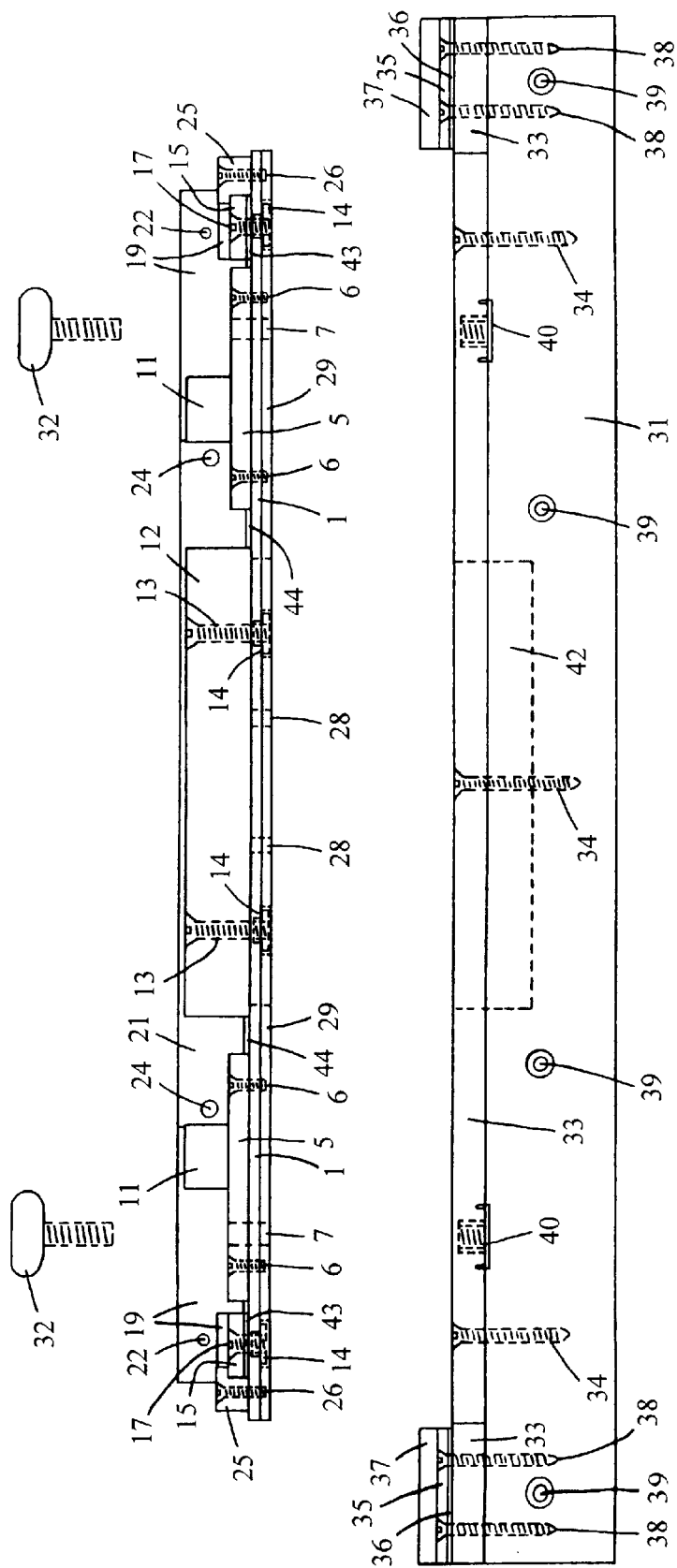
FIG. 11 shows an exploded front view of the apparatus with the working platform shown spaced above the securing means.
Figure 12:
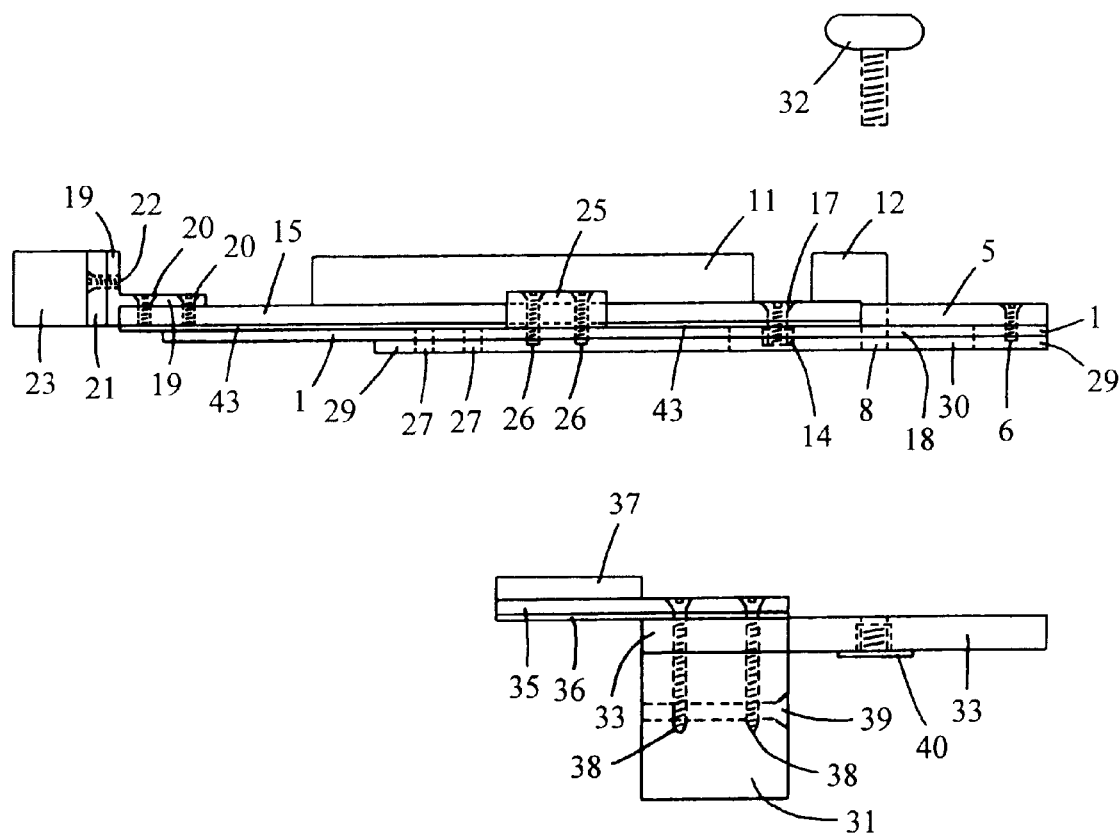
FIG. 12 shows an exploded end view of the apparatus with the working platform shown spaced above the securing means.
Figure 13:
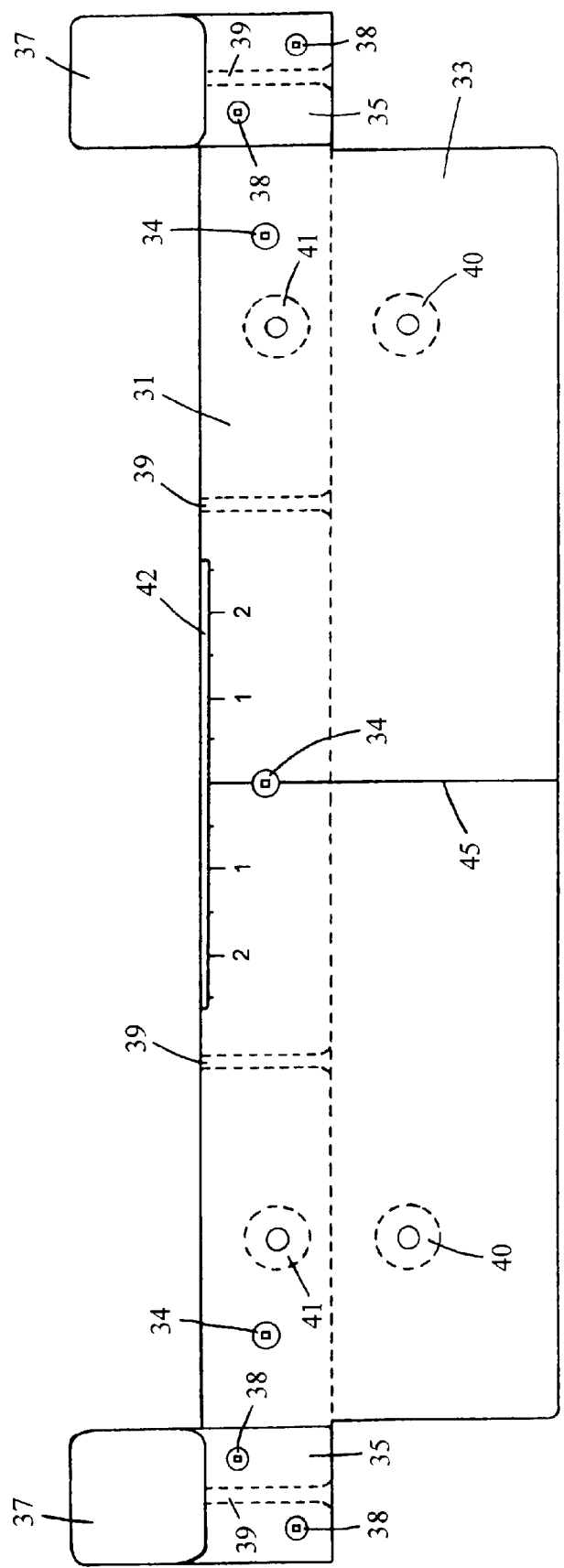
FIG. 13 shows a top view of the securing means.

Now referring to FIGS. 11–13, a mounting plate 33 is shown fastened onto a clamp bar 31 by means of three flat-headed wood screws 34. Located on top of the mounting plate 33, at each end of the clamp bar 31, are flange tabs 35. The flange tabs 35 are fastened onto the clamp bar 31 by means of flat-headed wood screws 38, which pass through the extension of the mounting plate 33. The underside of the flange tabs 35 are covered with a layer of hard plastic 36 glued onto them. As shown in FIG. 13, the overhanging portion of each flange tab 35 has a rectangular clampdown plate 37 glued onto the upper surface.

Also, located in the mounting plate 33 are spiked T-nuts 40 and 41, which are used for attaching the working platform onto the clamp bar assembly. Normally, the T-nuts 40 would be used. However, if the working platform is required to be positioned farther onto the workpiece, then the T-nuts 41 can be used.

In summary, by using one of clearance holes 7 and 8 on the triangular clampdown plates 5, in combination with one of the spiked T-nuts 40 and 41 on the mounting plate 33, the working platform can be placed in various positions farther onto the workpiece. When the working platform is attached to the clamp bar assembly in its normal position, i.e. clearance holes 7 and spiked T-nuts 40 are used, the front edge of the workpiece would be positioned slightly away from the front edge of the large rectangular hole 2. This allows the blade of the router bit to cut right to the front edge of the workpiece without causing damage to the working platform. A slightly recessed area 42 on the clamp bar 31 and on the mounting plate 33 provides a similar clearance between the router bit blade and the clamp bar assembly.

While it is intended that the clamp bar assembly be clamped onto a workpiece, countersunk holes 39 are provided so that the clamp bar assembly can be screwed onto the workpiece if necessary.

Figure 18:
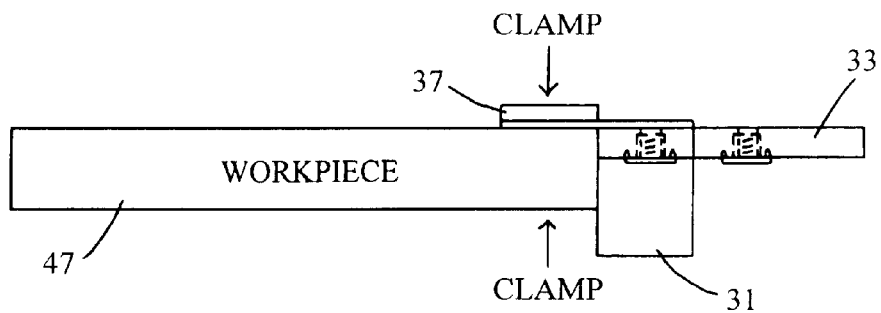
FIG. 18 shows an end view of the securing means and workpiece shown in FIGS. 14 and 15.

Now referring to FIGS. 14, 15 and 18, if the area to be routed 46 is on the flat side of the workpiece 47, then the clamp bar assembly is clamped onto the workpiece 47 as shown. In this case, the flange tabs 35 are used as clamping tabs, and are clamped onto the workpiece 47 as indicated by the "clamp" arrows in FIGS. 15 and 18. The working platform is then attached to the clamp bar assembly.

Figure 19:
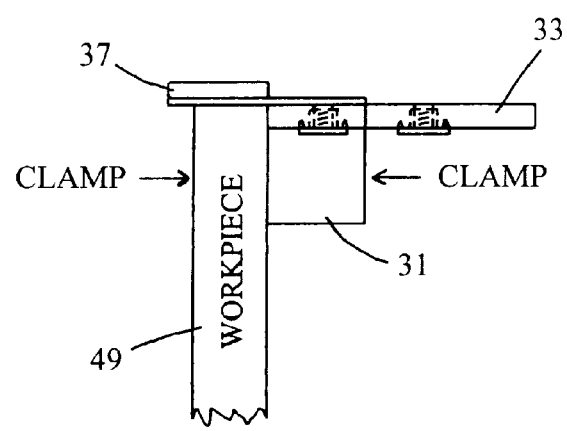
FIG. 19 shows an end view of the securing means and board-shaped workpiece of FIGS. 16 and 17.
Figure 20A:
FIGS. 20A–20D show side views of spacers having various thicknesses.
Figure 20B:
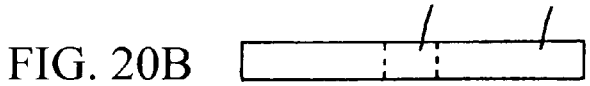
Figure 20C:
Figure 20D:
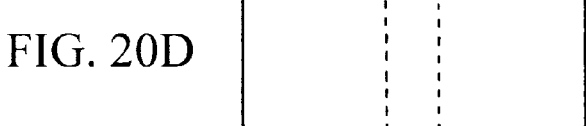
Figure 20E:
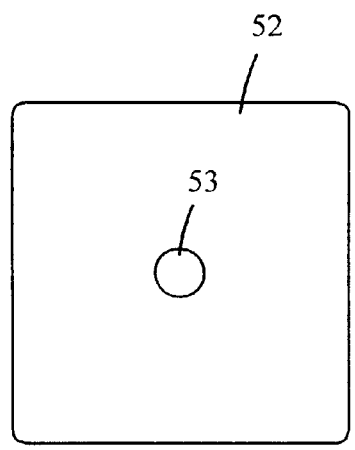
FIG. 20E shows a corresponding top view of the spacers shown in FIGS. 20A–20D.

If the area to be routed 48 is on the edge of the workpiece 49, then the clamp bar assembly is clamped onto the workpiece 49 as shown in FIGS. 16, 17 and 19. In this case, the flange tabs 35 are used as reference tabs, and each end of the clamp bar 31 is clamped onto the workpiece 49 as indicated by the "clamp" arrows in FIGS. 16 and 19. The working platform is then attached to the clamp bar assembly. The centerline 45, shown in FIG. 16, assists in correctly positioning the clamp bar assembly onto the workpiece, prior to routing.

Spacers 52, referred to as "smartguide spacers", of various thicknesses are shown in FIGS. 20A–20E. Each smartguide spacer 52 has a central hole 53 which allows access for longer screw knobs 54 to pass through them. These spacers 52 are used in conjunction with the smartguide as explained further below.

Figure 21:
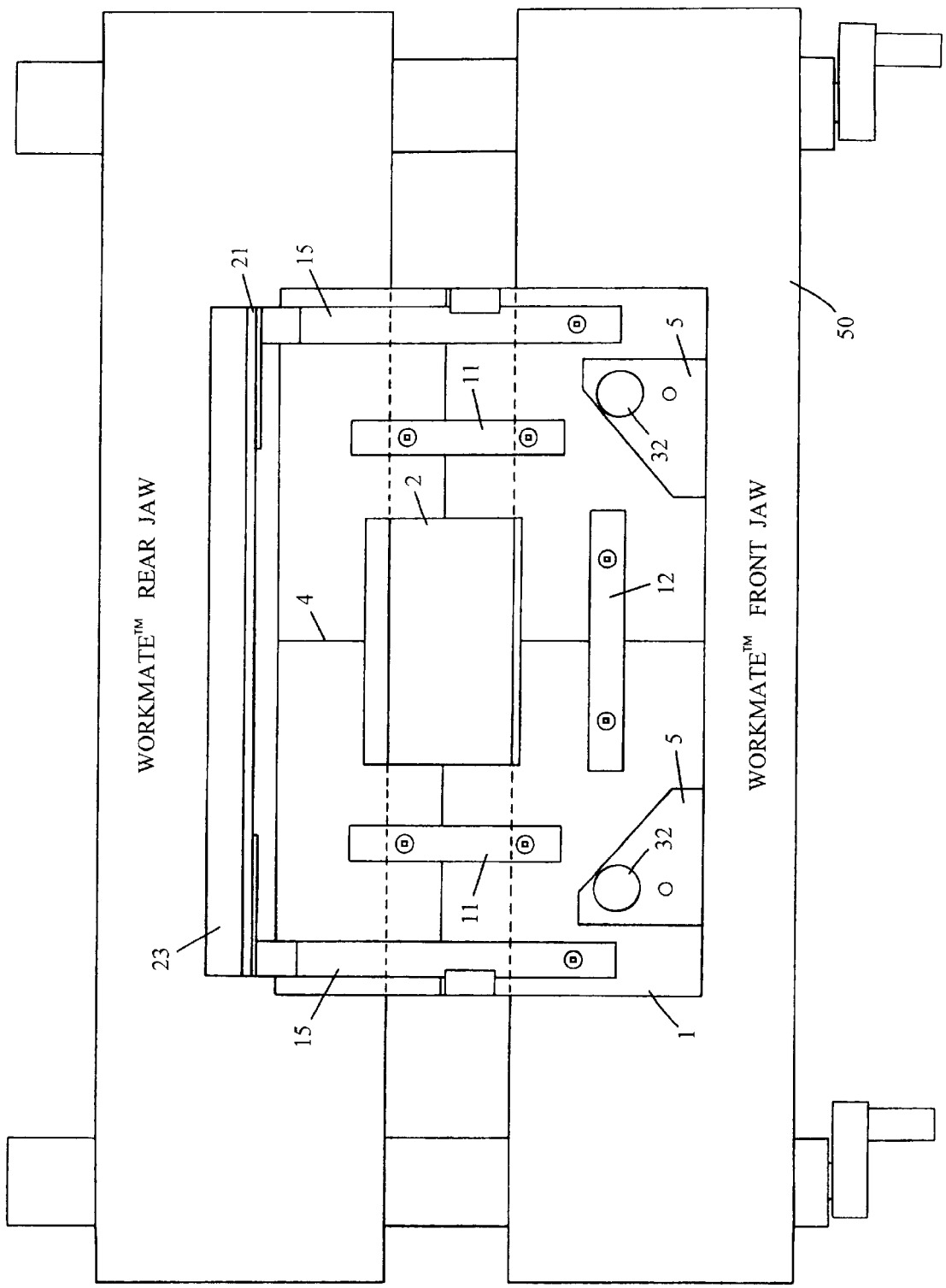
FIG. 21 shows a top view of the working platform mounted onto a portable workbench.
Figure 22:
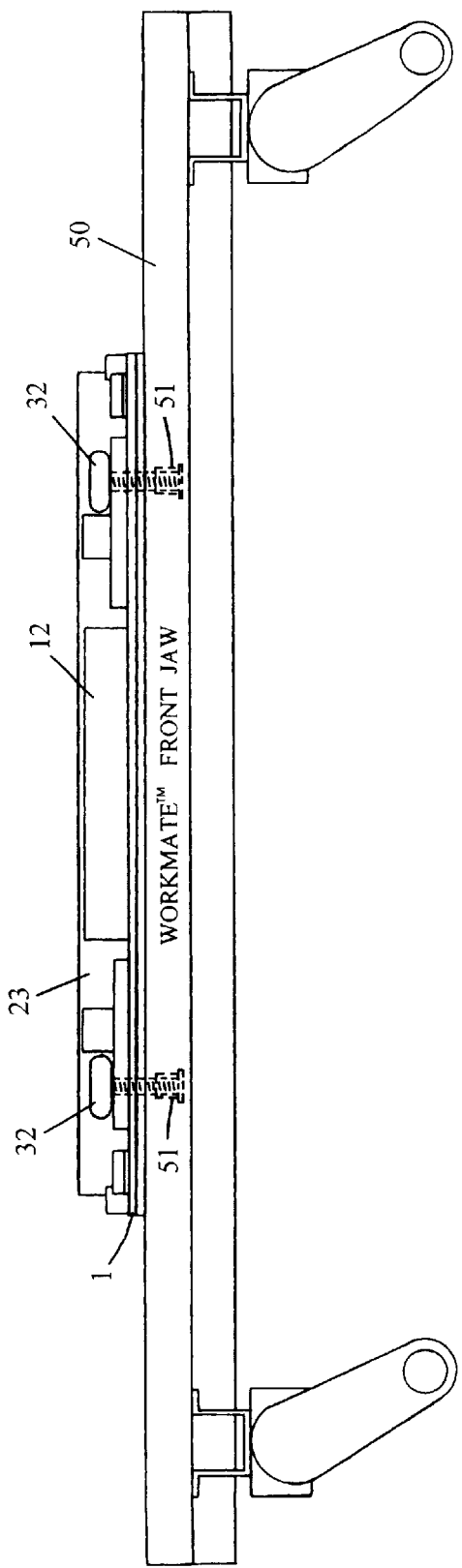
FIG. 22 shows a corresponding front view of the arrangement shown in FIG. 21.
Figure 24:
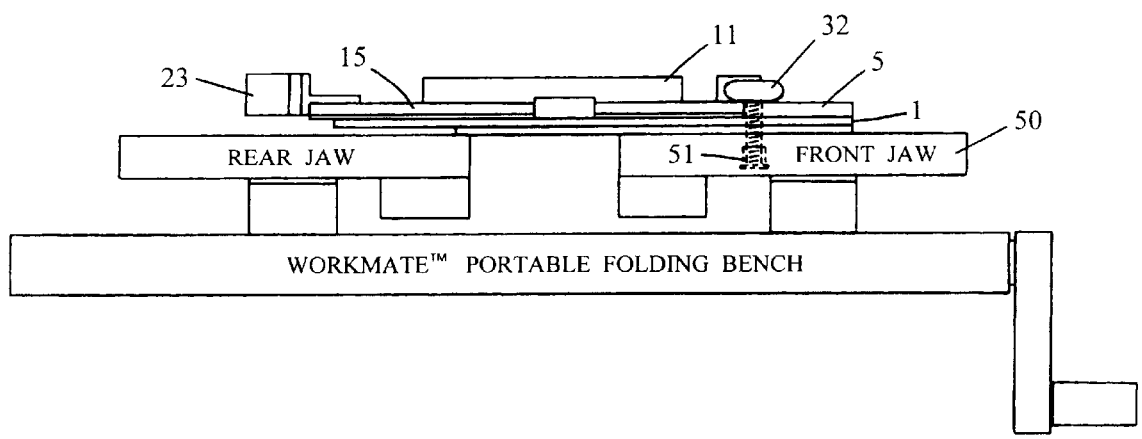
FIG. 24 shows an end view of the arrangement shown in FIG. 21.

The versatility of the smartguide may be enhanced by mounting the smartguide working platform onto a portable workbench, such as a Black & Decker Workmate™. In order to accommodate the smartguide working platform, two holes will have to be drilled into the top of the front (fixed) jaw of the Workmate™ or other working platform. This is shown in FIGS. 21 and 22. As shown in FIG. 22, threaded metal inserts 51 are installed into the two holes drilled into the Workmate™ in order for the smartguide working platform to be attached onto the front (fixed) jaw 50 of the Workmate™ by using screw knobs 32. The smartguide working platform can be attached directly to the front jaw 50 of the Workmate™ as shown in FIGS. 21, 22 and 24. Workpieces can then be clamped between the jaws of the Workmate™, either horizontally or vertically, underneath the working area 2 of the smartguide working platform, for various controlled routing jobs.

Figure 23:
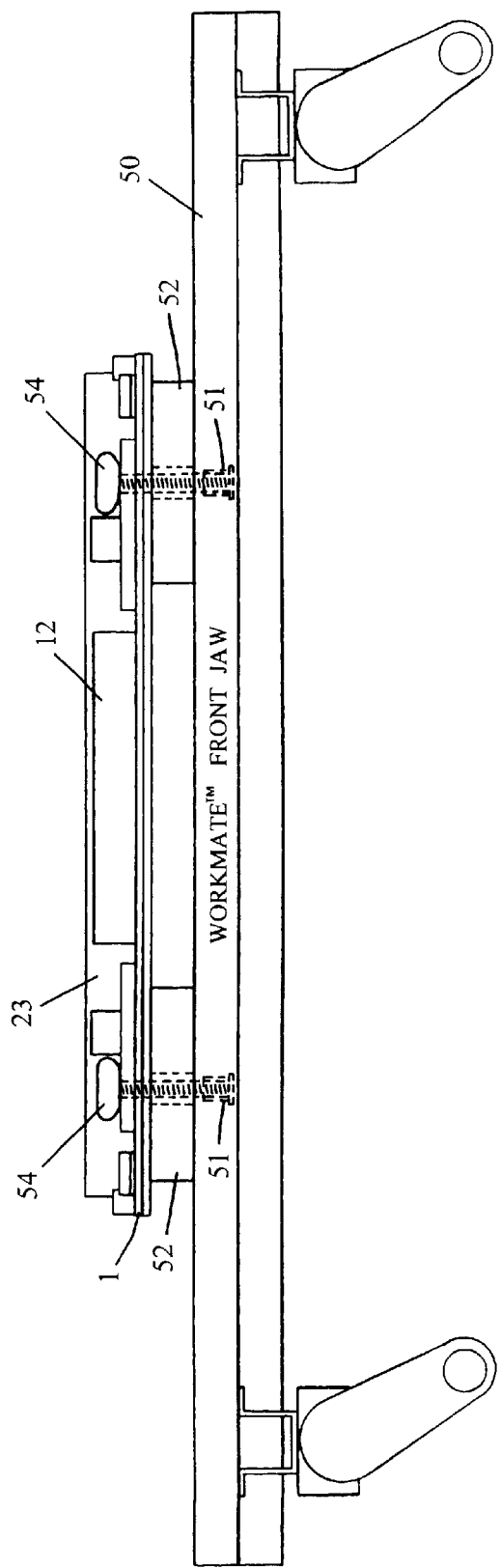
FIG. 23 shows a front view of the working platform mounted onto a portable workbench, with spacers to raise the working platform above the workbench.
Figure 25:
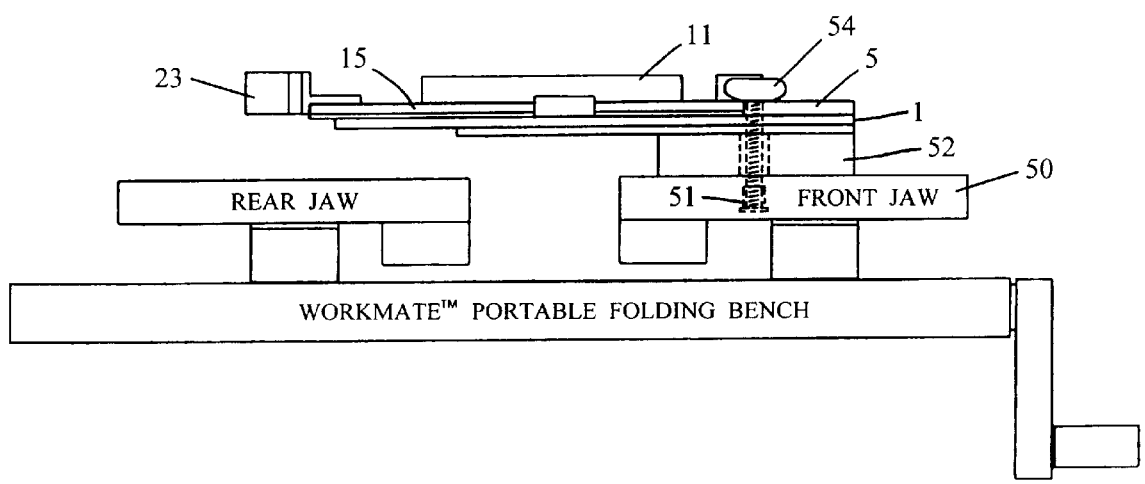
FIG. 25 shows an end view of the arrangement shown in FIG. 23.

Some situations will require that the smartguide working platform be raised higher above the Workmate™ jaws. This would be necessary, for example, if long workpieces that are to be clamped horizontally are too thick to fit underneath the smartguide. The working platform would also have to be raised in order to rout rabbets and tenons, as well as for routerplaning workpieces. The working platform is easily raised by means of the smartguide spacers 52, described above, as shown in FIGS. 23 and 25. The smartguide spacers 52 can be used as individual pairs, or in any combination of pairs, to raise the working platform in steps up to about 3" above the Workmate™ jaws.

Now referring to FIGS. 26–28, a jamb attachment plate 55 is shown which enables the smartguide working platform to be attached onto new, or existing, door and window frames. Using the jamb attachment plate 55, recesses can be routed for mounting hinges and latch plates, or for repairing old or damaged areas. As shown in FIG. 26, the jamb attachment plate 55 has a large rectangular notch 56 cut out of it, which coincides with the large rectangular hole 2 of the working platform.

Still referring to FIG. 26, reference lines 57 and 58 indicate where the center of the smartguide work area will be when the working platform is fastened onto the jamb attachment plate 55. Countersunk mounting holes 60 are provided so that the jamb attachment plate 55 can be mounted directly onto the rabbeted section of a door or window frame, using two #6 flat-headed wood screws. The smartguide working platform is fastened onto the jamb attachment plate 55 by means of screw knobs 32, which screw into two spiked T-nuts 59. If it is desired to mount the jamb attachment plate 55 with the working platform already attached onto it, then the clearance holes 61, which coincide with the clearance holes 27 in the working platform, can be used. In practice, the jamb attachment plate 55 can be mounted either way up to suit either a left or right door jamb.

Figure 29:
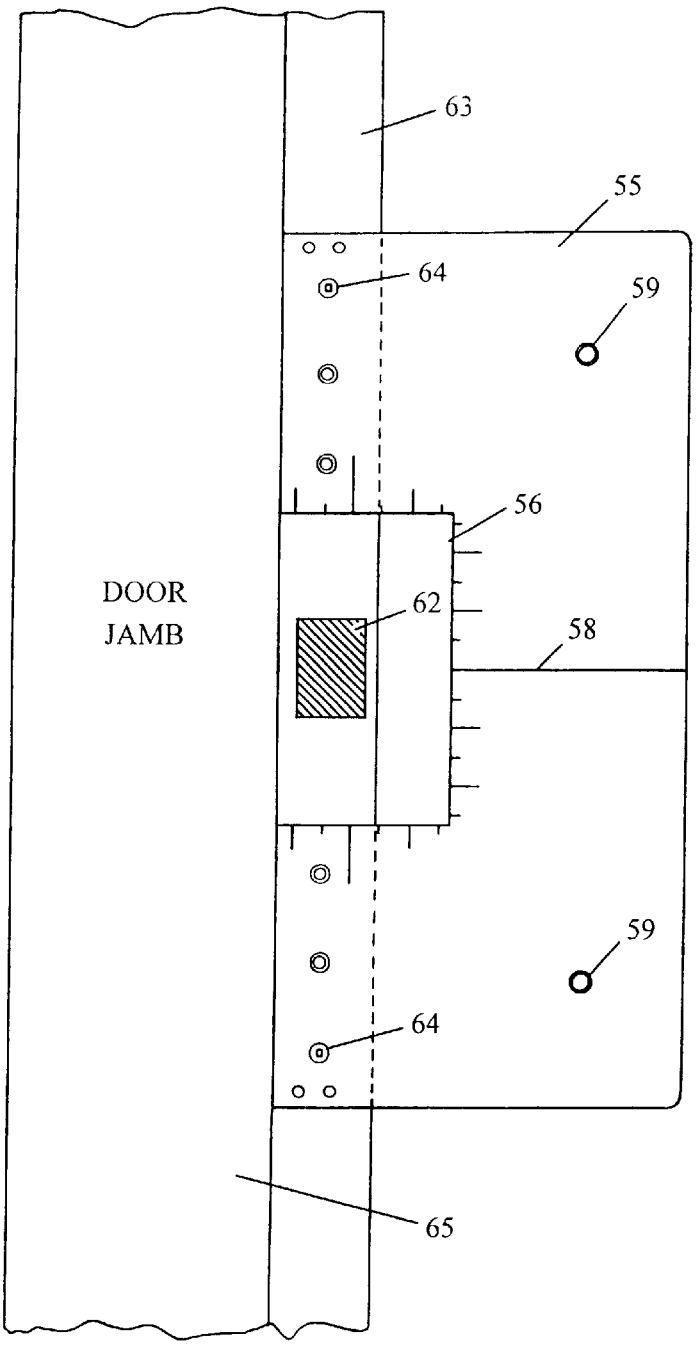
FIG. 29 shows a top view of the jamb attachment plate fastened onto a door jamb.
Figure 30:
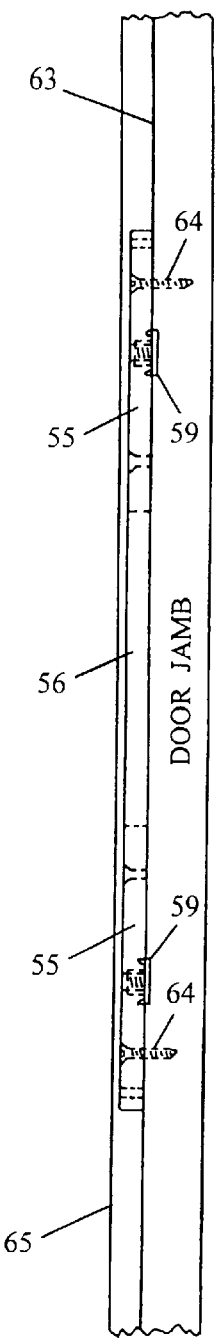
FIGS. 30 and 31 show a front view, and end view, respectively, of the arrangement shown in FIG. 29.
Figure 31:
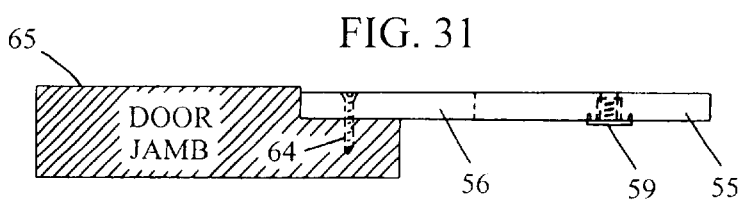

Now referring to FIGS. 29–31, in order to rout a recess 62 into a right door jamb 63, the jamb attachment plate 55 is mounted as shown, using two #6 flat-headed wood screws 64 in the countersunk mounting holes 60.

Figure 32:
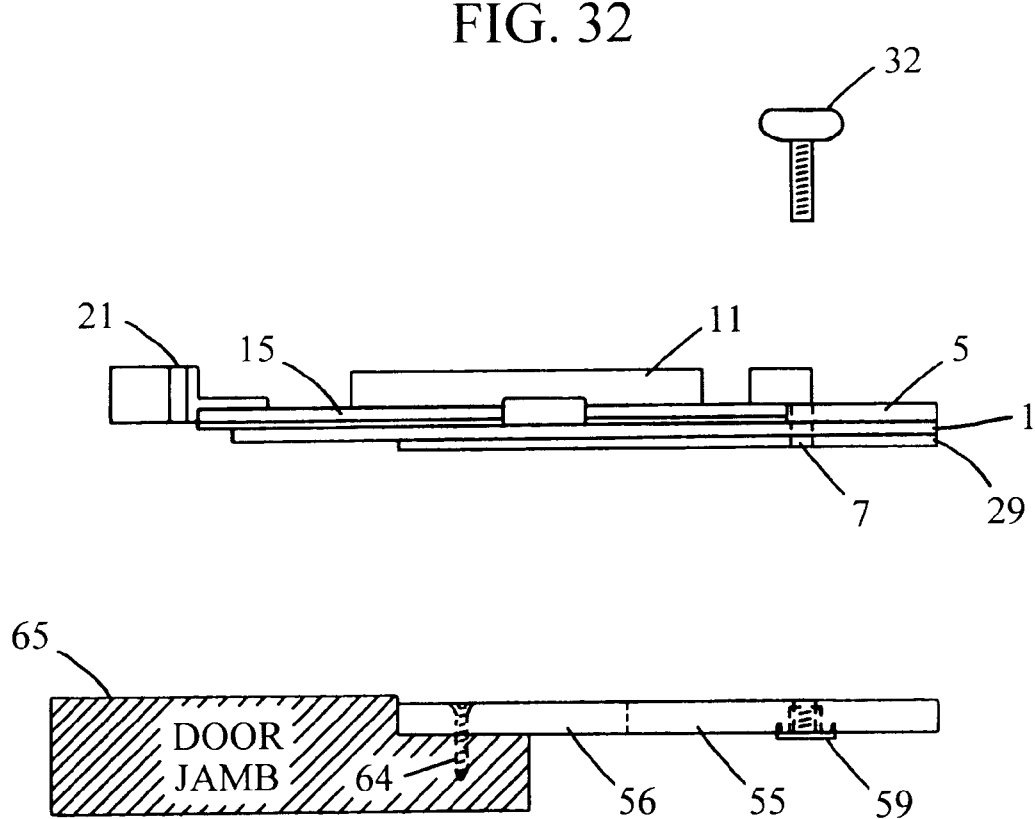
FIG. 32 shows an exploded end view of the working platform suspended above a jamb attachment plate and door jamb.
Figure 33:
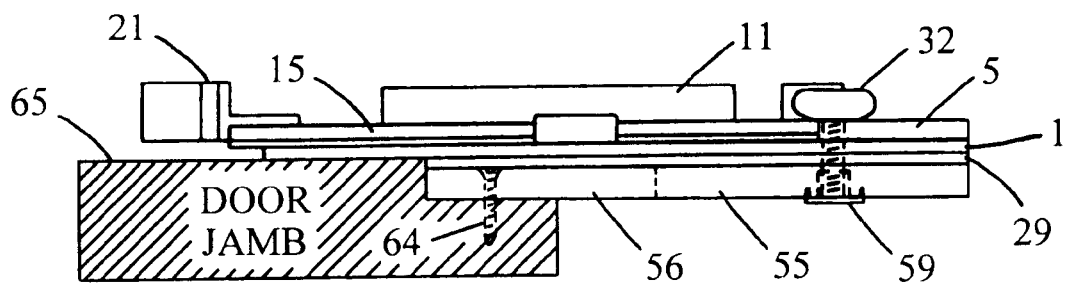
FIG. 33 shows an end view of the working platform mounted onto the jamb attachment plate.

The reason that the rear one quarter of the platform area 1 has no backing plate 29 glued onto its underside, as mentioned earlier, is so that the working platform can fit as closely as possible onto the non-rabbeted section 65 of the door jamb, thus obtaining the maximum cutting depth possible for the router bit in the rabbeted section 63 of the door jamb. FIGS. 32 and 33 illustrate how the working platform fits onto the jamb attachment plate 55 as described above.

Figure 34A:
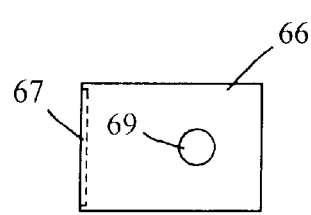
FIGS. 34A–34C show a top view, end view, and side view, respectively, of a setback gauge for setting the adjustable fences when using the setup shown in FIG. 33.
Figure 34B:
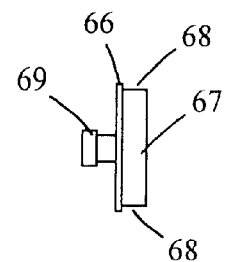
Figure 34C:
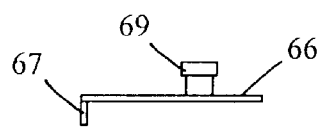
Figure 35:
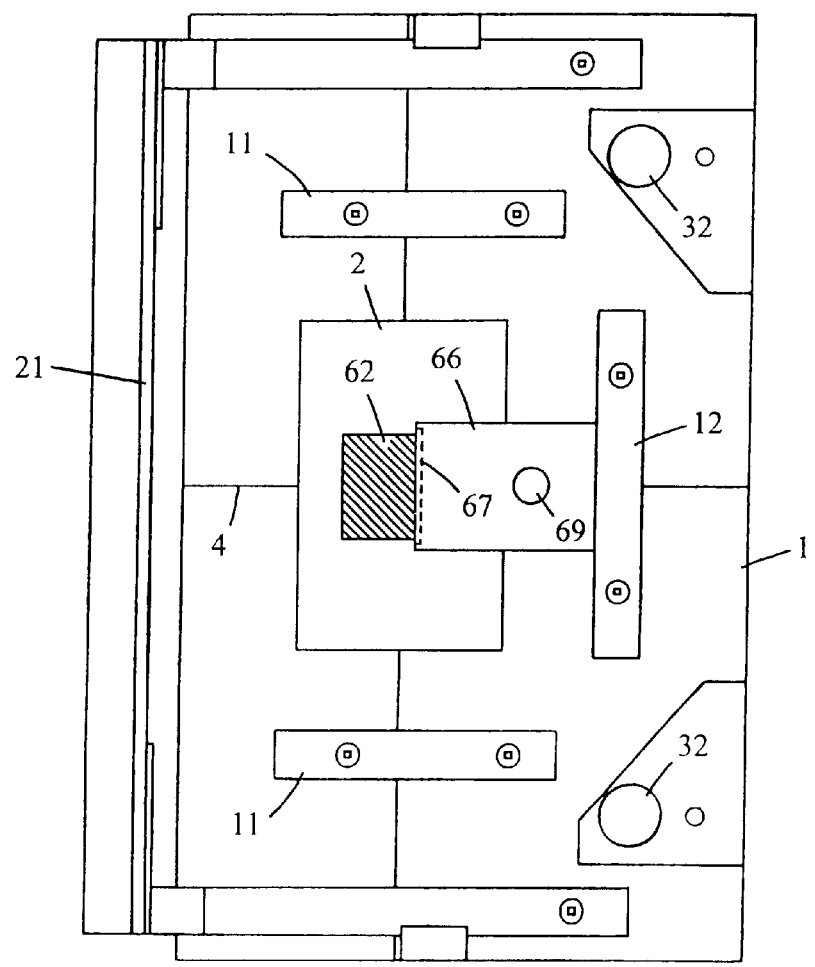
FIG. 35 shows a top view of the setup procedure for using the setback gauge.

Because the surface of the rabbeted section of the door jamb 63 is substantially below the top surface of the smartguide working platform, a setback gauge is required, which is specially configured for correctly adjusting fences 11, 12 and 21. The special setback gauge is shown in FIGS. 34A–34C, and consists of a body 66 with a right-angled flange 67 at one end. The right-angled flange 67 projects downward so that its bottom edge is very close to the surface of the rabbeted section of the door jamb 63. This enables the setback gauge to be aligned correctly to the cutting line around the required recess 62 without getting parallax errors. FIG. 35 shows the adjustable fence 12 positioned correctly against the cutting line.

Still referring to FIG. 35, the small notched-in areas 68 (shown in FIG. 34B) located at each end of the right-angled flange 67 are primarily provided to assist in the adjustment of the two inboard adjustable fences 11. These fences sometimes have to be set far enough forward that the bulk of the setback gauge body 66 will overhang the working area 2 such that it could become difficult to hold the setback gauge body 66 flush and parallel to the platform area 1 surface during the adjustment. In this case, the special setback gauge can be held close to one side of the working area 2, so that one of the small notched-in areas 68 can rest upon, and be supported by, the inner edges of the smartguide platform area 1 to help keep the special setback gauge level during adjustments. The knob 69, attached to the top of the special setback gauge body 66 assists in enabling the setback gauge to be held against each fence while the fence and setback gauge are being adjusted, especially when the smartguide is mounted vertically.

Figure 36:
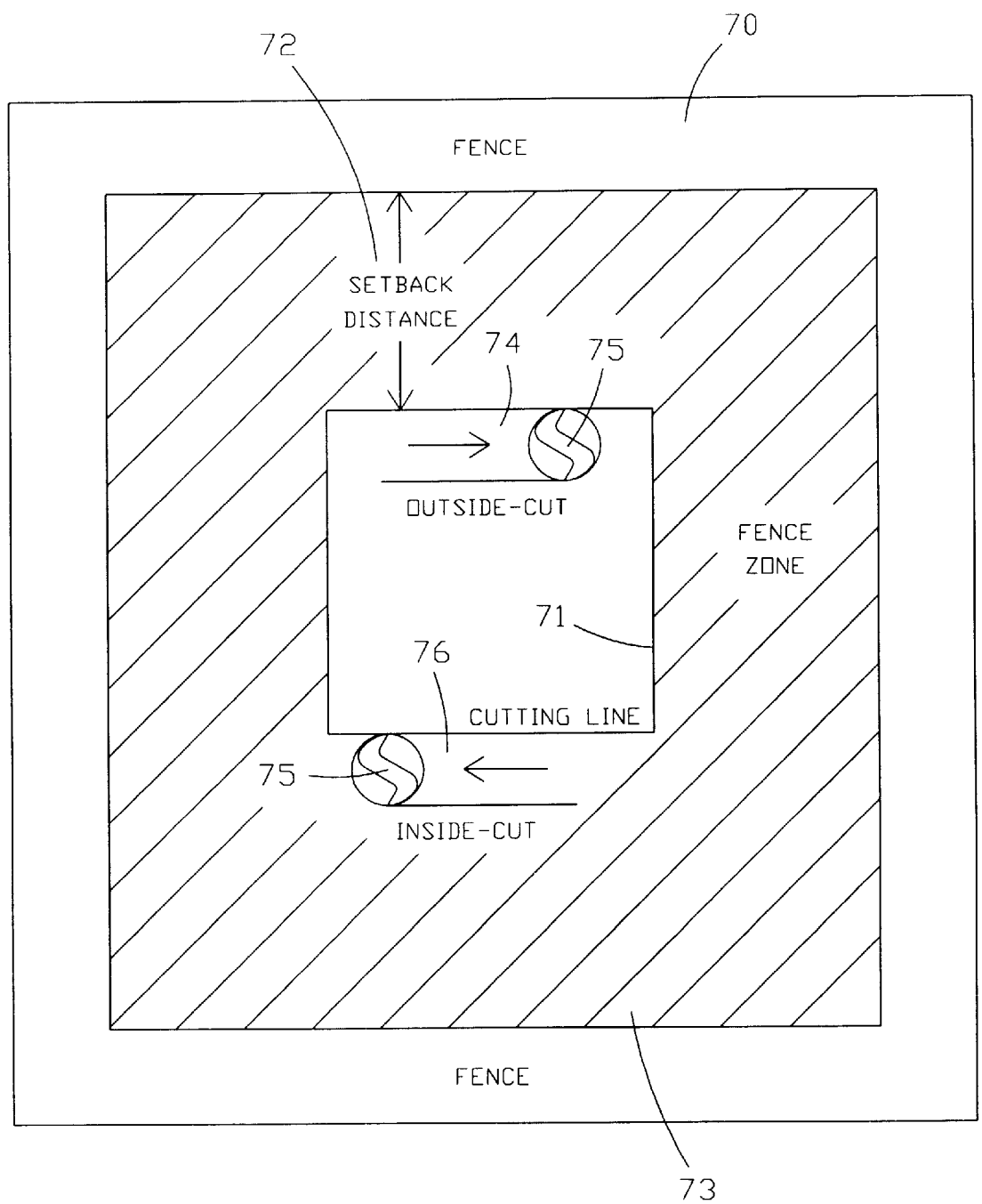
FIG. 36 illustrates the operational procedure for routing "outside cuts" and "inside cuts".

Now referring to FIG. 36, the principle of operation for using the smartguide is illustrated. The four fences of the smartguide are represented by the rectangular border 70, and the cutting line 71 represents the proposed rectangle that is to be routed on the workpiece. The four fences 70 of the smartguide each have to be positioned a specific distance away from the cutting line 71 on the workpiece, and this distance is called the setback distance 72. The area that lies between the four fences 70 of the smartguide and the cutting line 71 is called the fence zone 73, which is represented by the shaded area.

If a groove 74 cut by router bit 75 is required to be on the side of the cutting line 71 that is not inside the fence zone 73, then it is called an "outside cut". However, if another groove 76 cut by router bit 75 is required to be on the side of the cutting line 71 that is inside the fence zone 73, then it is called an "inside cut". Actual routing should always be done in a clockwise direction around the four fences of the smartguide, regardless of whether it is to be an "outside cut" or an "inside cut", to rout a groove around the perimeter of the proposed rectangle in the workpiece.

"Outside cuts" are used for routing grooves, slots, holes, and recesses, in a workpiece. They can also be used for the routing of rabbets if desired. For "outside cuts", after the perimeter of any hole or recess has been routed in a clockwise direction, any remaining internal area that needs to be removed can then be routed in a random manner. Also, when routing grooves or slots that will have the same width as the diameter of the router bit, only one fence is required, with possibly two other fences acting as endstops.

"Inside cuts" are used for the routing of tenons and are also the preferred method of routing rabbets. Any type of tenon can be routed in one operation if the workpiece is mounted vertically in the smartguide, and all sides of the tenon are routed in turn, using "inside cuts". Four-sided tenons will require the use of all four fences, each fence being set back the appropriate distance from the cutting line on the workpiece. Two-sided tenons will require the use of two opposing fences, each opposing fence being set back the appropriate distance from the cutting line on the workpiece. The other two fences are set back out of the way, so that the router bit can move completely off the workpiece at each end of the tenon.

Whenever the fences are set back out of the way on the smartguide, they should be set at their safeguard positions. This means that the fences should be set so that they will prevent the router bit from getting too close to the edges of the working area, and risking damage to the working platform. For example, three-sided tenons will require the use of three fences, each fence being set back the appropriate distance from the cutting line on the workpiece, with the fourth fence being set back to its safeguard position.

The actual routing for "inside cuts" requires a large diameter router bit in the router, say ¾" diameter, and the routing should be done in a clockwise direction inside the four fences to cut each side of the tenon in turn. It is very important when making "inside cuts" that, whenever the router bit is over the workpiece, the base of the router always be held against the fence for each side of the tenon being routed. Otherwise, the tenon being cut will be damaged or destroyed. Actually, it is not difficult to keep the base of the router held against each fence when making "inside cuts", because there is a natural tendency for this to occur, due to the torque from the clockwise rotation of the router bit.

An additional advantage to using "inside cuts" for making tenons is that the router bit uses an inward cutting action to rout each side of the tenon, which greatly reduces the chance that breakouts will occur.

If a shelf is required on the tenon, then this can be accomplished without requiring any extra adjustment of the fences during routing, by placing a fence buffer (not shown) against the fence on the side the shelf is required. The fence is adjusted prior to routing with the fence buffer in place, then after the tenon has been routed, the fence buffer can be removed to rout the shelf region of the tenon. The width of the fence buffer used would correspond to at least the width of the shelf required, and the length of the fence buffer would be substantially the length of the fence.

The smartguide can also be used for routerplaning a workpiece. In other words, the top surface of a workpiece can be planed using a router. Routerplaning requires that all four of the smartguide fences be set back out of the way, to their safeguard positions. A large diameter blade, say ¾" diameter, should be used for routerplaning. The router is moved in a clockwise direction, with the router bit only partly on the workpiece, in order to rout the outside perimeter of the workpiece surface, and then the remaining area can be routed in a random manner. Using this method of routerplaning ensures that no breakouts will occur, because the outside perimeter of the workpiece is routerplaned using an inward cutting action of the router bit. Unless large amounts of material need to be removed, routerplaning should be done in steps of not more than about 1/16" at a time.

All adjustments to the fences of the smartguide can be easily made, both for "outside cuts" and for "inside cuts", and for all sizes of router bits, by means of the setback gauges described in the inventor's copending patent application Ser. No. 09/207,759 (Attorney Docket No. 10258-002).

While the above disclosure has set out in specific detail the preferred embodiment of the present invention, it will be obvious to those skilled in the art that changes and modifications may be made without departing from the spirit and scope of the invention, as claimed in the following claims.

I claim:

1. A guide apparatus, for use with a router having a base, an edge on the base for guiding the router, and a router bit extending out from the router for rotation about a router axis, the guide apparatus comprising:
   (1) a working platform;
   (2) securing means for securing the working platform to a workpiece with the working platform mounted on the securing means, said securing means being separable from said working platform;
   (3) an aperture for the router bit to extend therethrough; and
   (4) a fence means on the working platform for guiding the base of the router, said fence means comprising a plurality of independently adjustable guide fences, at least one of the guide fences being an outboard fence positionable beyond the working platform.

2. A guide apparatus as claimed in claim 1, wherein the securing means comprises a clamping projection means extending down below the working platform whereby, in use, the clamping projection means can be clamped to the workpiece.

3. A guide apparatus as claimed in claim 2, wherein the clamping projection means comprises a generally elongate clamping bar, extending out beyond the working platform at either end thereof.

4. A guide apparatus as claimed in claim 3, wherein the securing means includes flange tabs projecting from the ends of the clamping bar and located beside and substantially parallel to the working platform.

5. A guide apparatus as claimed in claim 3, wherein the aperture is open on one side thereof.

6. A guide apparatus as claimed in claim 1, wherein the outboard fence comprises: an elongate outboard fence member, and a pair of outboard fence adjustment arms, each of which is secured at one end to the outboard fence member so as to extend perpendicularly therefrom, the other ends of the fence adjustment arms being securable to the working platform.

7. A guide apparatus as claimed in claim 6, wherein, for each inboard fence and the outboard fence, there is provided a pair of scales, to enable the fences to be set squarely relative to the aperture.

8. A guide apparatus as claimed in claim 3, wherein the clamping bar is separable from the working platform, to permit the working platform to be secured separately to one of a workpiece and a work support surface.

9. A guide apparatus as claimed in claim 8, wherein the securing means includes a mounting plate, with the clamping bar secured to the mounting plate, and wherein the mounting plate includes threaded bores, the working platform is provided with a plurality of clearance holes and screw knobs are provided having threaded shafts extending through the clearance holes of the working platform and engaging the threaded bores of the mounting plate, to secure the working platform to the mounting plate.

10. A guide apparatus as claimed in claim 9, wherein the mounting plate and clamping bar include a recessed area aligned with the aperture, to provide clearance for the router bit.

11. A guide apparatus as claimed in claim 8, in combination with one of:
   (1) a plurality of spacers for mounting between the working platform and a workpiece or work support surface; and
   (2) a jamb attachment plate for securing to a door jamb and to which the working platform is secured for routing a door jamb.

12. A method of routing a workpiece, the method comprising:
   (1) providing a portable router having a router base and a router bit extending from the base;
   (2) providing a guide apparatus comprising
      (a) a working platform;
      (b) securing means for securing the working platform to a workpiece, said securing means being separable from said working platform;
      (c) an aperture for the router bit to extend therethrough; and
      (d) a fence means on the working platform for guiding the base of the router, said fence means comprising a plurality of independently adjustable guide fences, at least one of the guide fences being an outboard fence positionable beyond the working platform;
   (3) mounting the guide apparatus by the securing means to a workpiece;
   (4) adjusting the fence means to a desired location, and selecting and fitting a desired router bit to the router; and
   (5) operating the router and guiding the router on the working platform by the fence means to rout the workpiece.

13. A method as claimed in claim 12, which comprises applying the method to a workpiece which is generally sheet-form, has relatively large and parallel top and bottom surfaces and a relatively narrow side edge surface, and wherein the method comprises:

(a) providing a securing means having a clamping bar providing surfaces perpendicular to the working platform and flange tabs substantially parallel to the working platform; and (b) clamping one of the flange tabs and the perpendicular clamping surfaces to one of the top and bottom surfaces of the workpiece adjacent the side edge surface thereof, for routing the workpiece on the side edge surface or adjacent the side edge surface.

14. A method as claimed in claim 13, which includes:

(a) securing the workpiece in a work bench; and (b) securing the working platform to the work bench above the workpiece.

15. A method as claimed in claim 14, which additionally includes providing spacers between the work bench and the working platform, to space the working platform a desired distance above the work bench.

16. A method as claimed in claim 15, which includes providing threaded bores in the work bench and clearance holes in the working platform, and securing the working platform to the work bench with screw knobs having threaded shafts extending through the clearance holes and engaging the threaded bores of the work bench.

17. A method as claimed in claim 16, which includes:

(a) applying the method to a jamb;

(b) providing a jamb plate and securing the jamb plate to the jamb; and (c) securing the working platform to the jamb plate.

* * * * *